(12) United States Patent
Brita et al.

(10) Patent No.: US 8,557,931 B2
(45) Date of Patent: Oct. 15, 2013

(54) MULTISTAGE PROCESS FOR THE POLYMERIZATION OF ETHYLENE

(75) Inventors: Diego Brita, Ferrara (IT); Gianni Collina, Ferrara (IT)

(73) Assignee: Basell Polyolefin GmbH, Wesseling (DE)

( * ) Notice: Subject to any disclaimer, the term of this patent is extended or adjusted under 35 U.S.C. 154(b) by 47 days.

(21) Appl. No.: 13/201,202

(22) PCT Filed: Feb. 15, 2010

(86) PCT No.: PCT/EP2010/051844
§ 371 (c)(1),
(2), (4) Date: Aug. 11, 2011

(87) PCT Pub. No.: WO2010/097305
PCT Pub. Date: Sep. 2, 2010

(65) Prior Publication Data
US 2012/0010374 A1    Jan. 12, 2012

Related U.S. Application Data

(60) Provisional application No. 61/209,533, filed on Mar. 6, 2009.

(30) Foreign Application Priority Data

Feb. 27, 2009   (EP) .................................. 09153872

(51) Int. Cl.
| | | |
|---|---|---|
| C08F 2/00 | (2006.01) | |
| C08F 4/00 | (2006.01) | |
| C08F 210/00 | (2006.01) | |
| C08F 110/02 | (2006.01) | |

(52) U.S. Cl.
USPC ............. 526/64; 526/65; 526/90; 526/348; 526/352

(58) Field of Classification Search
USPC ................ 526/64, 65, 90, 348, 352
See application file for complete search history.

(56) References Cited

U.S. PATENT DOCUMENTS

| 3,953,414 | A | * | 4/1976 | Galli et al. ................. 526/124.2 |
| 4,399,054 | A | | 8/1983 | Ferraris |
| 4,469,648 | A | | 9/1984 | Ferraris |
| 4,816,433 | A | | 3/1989 | Terano |
| 4,829,034 | A | | 5/1989 | Iiskolan |
| 5,100,849 | A | | 3/1992 | Miya |
| 5,286,564 | A | | 2/1994 | Cecchin et al. |

FOREIGN PATENT DOCUMENTS

| EP | 057420 | 8/1982 |
| EP | 0649860 | 4/1995 |
| EP | 0395083 | 11/1997 |
| EP | 1611175 | 5/2006 |
| GB | 1577512 | 10/1980 |
| WO | WO 98/44009 | 10/1998 |

* cited by examiner

*Primary Examiner* — William Cheung

(57) ABSTRACT

The present invention relates to a slurry process for preparing an ethylene polymer having a melt flow ratio F/P, according to ASTM 1238, of higher than 25, carried out in two or more stages of polymerization at temperatures in the range from 60 to 120° C., in which at least two of the said two or more polymerization stages are carried out under different concentration of a molecular weight regulator, said process being carried out in the presence of a catalyst system comprising the product obtained by contacting (A) a solid catalyst component comprising Ti, Mg, halogen, and having a porosity ($P_F$), measured by the mercury method and due to pores with radius equal to, or lower than, 1 μm of at least 0.3 cm$^3$/g and a surface area determined by BET method, of lower than 100 m$^2$/g, and (B) of an organoaluminum compound.

10 Claims, No Drawings

MULTISTAGE PROCESS FOR THE POLYMERIZATION OF ETHYLENE

This application is the U.S. national phase of International Application PCT/EP2010/051844, filed Feb. 15, 2010, claiming priority to European Application 09153872.8 filed Feb. 27, 2009 and the benefit under 35 U.S.C. 119(e) of U.S. Provisional Application No. 61/209,533, filed Mar. 6, 2009; the disclosures of International Application PCT/EP2010/051844, European Application 09153872.8 and U.S. Provisional Application No. 61/209,533, each as filed, are incorporated herein by reference.

The present invention relates to a multistage slurry process for the polymerization of ethylene, in particular for the production of broad molecular weight distribution polyethylene, carried out in the presence of a catalyst system comprising a solid catalyst component having specific chemical and physical features.

Slurry polymerization for preparing ethylene polymers is a known technique in which a non polymerizable hydrocarbon diluent is used as reaction medium. This kind of polymerization is generally carried out in a turbulent flow reactor, such as a continuous pipe reactor in the form of a loop, or in continuous stirred tank reactors (CSTR). The so-called loop reactor is well known and is described in the Encyclopedia of Chemical Technology, 3rd edition, vol. 16 page 390. In the loop reactor and the CSTR as well LLDPE and HDPE resins can be produced.

The MWD is a particularly important characteristic for ethylene (co) polymers, in that it affects both the rheological behavior and therefore the processability of the melt, and the final mechanical properties. Polyolefins having a broad MWD, particularly coupled with relatively high average molecular weights, are preferred in high speed extrusion processing and in blow molding, conditions in which a narrow MWD could cause melt fracture. As a consequence of this need, different methods have been developed trying to achieve this property.

One of those is the multi-step process based on the production of different molecular weight polymer fractions in each single stage, sequentially forming macromolecules with different length on the catalyst particles.

To this end, it can be used a double loop reactor where the two reactors are connected in series in which a high molecular weight fraction may be produced in the first loop reactor and a low molecular weight fraction may be produced in the second loop reactor. In this way, a bimodal polymer or a polymer having a broad molecular weight distribution is made. In a double loop reactor where the two reactors are connected in parallel, either a monomodal or a bimodal product is made.

The preparation of a multimodal polyethylene in a double loop reactor with the reactors connected in series is described for example in EP0649860. Ethylene is injected with the comonomer in the first loop reactor as well as the catalytic system (i. e. the catalyst precontacted with the activating agent). Suitable comonomers, which can be used, include alpha-olefins with from 3 to 10 atoms of carbon, preferably 1-hexene. Polymerization is carried out at a temperature of between 50 and 120° C., preferably between 60 and 110° C., and at a pressure between 1 and 100 bars, preferably between 30 and 50 bars. The flow of ethylene polymer obtained in the first reactor is transferred into the second reactor by means of one or more settling legs of the first reactor, for example by using two settling legs (each being filled independently with the suspension coming from the reactor, the solids being concentrated by gravity settling and discharge).

A multimodal polyethylene can also be prepared via a multistage reaction sequence comprising successive slurry polymerization stages carried out under predetermined different reaction conditions in respective continuously stirred tank reactors arranged in series so as to obtain respective polyethylene fractions having different molecular weights. In this case, monomers and a molar mass regulator, preferably hydrogen, are firstly polymerized in a first reactor under first reaction conditions in the presence of the suspension medium and a suitable catalyst, preferably a Ziegler catalyst, then transferred to a second reactor and further polymerized under second reaction conditions, and, if the polyethylene to be prepared is for example trimodal, further transferred to a third reactor and further polymerized under third reaction conditions, with the first reaction conditions differing from the second and third reaction conditions so as to obtain three polyethylene fractions having different molecular weights. This difference in molecular weight in the different ethylene polymer fractions is normally evaluated through the weight average molecular weight $M_w$.

The polyethylene is often produced as morphology irregular resin powder which is removed from the reactor and extruded into morphology regular pellets before it is sold. Typically, an extruder works by melting and homogenizing the resin powder and then forcing it through holes before cutting to form pellets. The pellets are then converted into the desired form depending on the final applications such as pipe, fibers, and molded articles.

Independently from the technology used, a problem typically associated with the processes of this type is that the different polymerization conditions used in the two or more steps can lead to the production of not sufficiently homogenous products, especially in cases of very broad molecular weight distribution of the final resins. It is in fact difficult to obtain products having a very broad molecular weight distribution which when subject to a transformation process, yield products with a low number of unmelt particles (gels).

While for certain end uses/applications this can represent only an aesthetic problem, in certain fields like that of pipes, and in particular pressure pipe, the problem is also technical because the irregularities due to the presence of unmelted particles could be responsible for mechanical failures. Moreover, it would be also important that the catalyst is able to impart to the polymer mechanical features so as to give, in the blown film manufacture good bubble stability.

According to EP1611175 B1, the problem can be allegedly solved, only in loop reactor technology, by using a Ziegler-Natta catalyst having a particle size distribution D50 of less than 20 μm and greater than 5 μm. According to said document using a Ziegler-Natta catalyst having such a granulometry, allows to obtain a lower amount of large polymer particles and an increased polymer bulk density which also results in a higher settling efficiency. In addition, due to the smaller average particle size, also the solid residence time and therefore the productivity would be increased. However, this document is completely silent with respect to the homogeneity and activity problem in different type of reactors, such as, continuously stirred tank reactors (CSTR), and, in fact, the applicant experienced that the solution proposed in said document does not bring about any improvement in CSTR based technology. On the other hand, the experiments described in EP 1611175 B1 do not contain any information whatsoever in terms of the features of the catalyst apart from its size. Accordingly, said document is of no help in finding a versatile solution applicable to different type of reactors.

The applicant has now found that a slurry multistep process carried out in the presence of a catalyst comprising a component with certain physical and chemical features is able to produce an ethylene polymer with broad MWD and good mechanical properties, without showing, or minimizing, the above mentioned homogeneity problems while maintaining good polymerization activities.

Accordingly, it constitutes an object of the present invention a slurry process for preparing an ethylene polymer having a melt flow ratio F/P, which is the ratio among the melt index value measured according to ASTM 1238 condition "F" and the melt index value measured according to ASTM 1238 condition "P" of higher than 25, carried out in two or more stages of polymerization at temperatures in the range from 60 to 120° C., in which at least two of the said two or more polymerization stages are carried out under different amounts of molecular weight regulator, said process being carried out in the presence of (A) a solid catalyst component comprising Ti, Mg, halogen, and having a porosity ($P_F$), measured by the mercury method and due to pores with radius equal to, or lower than, 1 μm, of at least 0.3 cm$^3$/g and a surface area determined by BET method, of lower than 100 m$^2$/g, and (B) of an organoaluminum compound.

Preferably, the porosity ($P_F$) is higher than 0.4 cm$^3$/g and preferably ranging from 0.4 to 1 cm$^3$/g more preferably from 0.45 to 0.9.

Preferably the said solid catalyst component (A) is characterized by a surface area determined by BET method, ranging from 30 to 80 m$^2$/g.

The porosity measured by the BET method is generally comprised between 0.1 and 0.7, preferably from 0.15 to 0.5 cm$^3$/g.

In a preferred aspect the catalyst component of the invention comprises a Ti compound having at least one Ti-halogen bond supported on a magnesium chloride which is preferably magnesium dichloride and more preferably magnesium dichloride in active form. In the context of the present application the term magnesium chloride means magnesium compounds having at least one magnesium chloride bond.

In the catalyst component of the invention the average pore radius value, for porosity due to pores up to 1 μm, is higher than 0.06 μm, preferably higher than 0.08 μm and more preferably in the range 0.0850-0.18 μm.

The particles of solid component (A) preferably have substantially spherical morphology and average diameter comprised between 5 and 50 μm, preferably from 8 to 35 μm, more preferably from 10 to 30 μm and especially from 10 to 25 μm. As particles having substantially spherical morphology, those are meant wherein the ratio between the greater axis and the smaller axis is equal to or lower than 1.5 and preferably lower than 1.3.

The magnesium dichloride in the active form is characterized by X-ray spectra in which the most intense diffraction line which appears in the spectrum of the non active chloride (lattice distanced of 2.56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The solid components of the invention may comprise an electron donor compound (internal donor), selected for example among ethers, esters, amines and ketones. If any it is advisable to use low amounts of donor, such as to give ED/Ti molar ratios in the final solid catalyst component lower than 1, preferably lower than 0.5 and in certain cases not to include any amount of electron donor compound in order for it to be absent in the final solid catalyst component (A).

The preferred titanium compounds have the formula $Ti(OR^{II})_nX_{y-n}$, wherein n is a number comprised between 0 and 3 inclusive, y is the valence of titanium, $R^{II}$ is an alkyl, cycloalkyl or aryl radical having 1-8 carbon atoms and X is halogen. In particular $R^{II}$ can be ethyl, isopropyl, n-butyl, isobutyl, 2-ethylhexyl, n-octyl and phenyl, (benzyl); X is preferably chlorine.

If y is 4, n varies preferably from 0 to 2; if y is 3, n varies preferably from 0 to 1. $TiCl_4$ is especially preferred.

The preparation of the solid catalyst component can be carried out according to several methods.

A method suitable for the preparation of spherical components mentioned above, comprises a step in which a compound $MgCl_2 \cdot mR^{III}OH$, wherein $0.3 \leq m \leq 1.7$ and $R^{III}$ is an alkyl, cycloalkyl or aryl radical having 1-12 carbon atoms is reacted with the said titanium compound of the formula $Ti(OR^{II})_nX_{y-n}$, in which n, y, X and $R^{II}$ have the same meaning defined above.

In this case $MgCl_2 \cdot mR^{III}OH$ represents a precursor of Mg dihalide. Suitable $MgCl_2 \cdot mR^{III}OH$ precursors can generally be prepared by subjecting precursors having a higher amount of alcohol to a thermal and/or chemical dealcoholation process. The thermal dealcoholation process is carried out in nitrogen flow at temperatures comprised between 50 and 150° C. until the alcohol content is reduced to the value ranging from 0.3 to 1.7. A process of this type is described in EP 395083.

The precursors to be dealcoholated are obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034.

In the reaction step between the titanium compound and the $MgCl_2 \cdot mR^{III}OH$ precursor, the molar ratio Ti/Mg is stoichiometric or higher; preferably this ratio is higher than 3. Still more preferably a large excess of titanium compound is used. Preferred titanium compounds are titanium tetrahalides, in particular $TiCl_4$. The reaction with the Ti compound can be carried out by suspending the adduct in cold $TiCl_4$ (generally 0° C.); the mixture is heated up to 80-140° C. and kept at this temperature for 0.5-8 preferably from 0.5 to 3 hours.

The excess of titanium compound can be separated at high temperatures by filtration or sedimentation and siphoning.

Also the particle size distribution is narrow being the SPAN of the catalyst particles comprised between 0.7 and 1.3 preferably from 0.8 to 1.2. The SPAN being defined as the value of the ratio $$\frac{P90 - P10}{P50},$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

According to another preferred method the catalyst component (A) can be obtained by a process comprising (a) the thermal dealcoholation of adducts $MgCl_2 \cdot pEtOH$ until forming adducts in which the alcohol content is reduced to values lower than 2 and preferably comprised between 0.5 and 1.5 mols per mol of magnesium dihalide, (b) the treatment of said thermally dealcoholated adduct with chemical reagents capable of reacting with the OH groups of the alcohol and of further dealcoholating the adduct until the content is reduced to values which are generally lower than 0.5 mols and (c) the reaction of said chemically dealcoholated adduct with a Ti compound of formula $Ti(OR^{II})_{n-y}X_y$, where X, $R^{II}$, and y have the same meanings described above and n can be from 0 to 4. The adducts can also be dealcoholated to a very great extent, by reducing the alcohol content down to values lower than 0.05 mols.

The treatment with the dealcoholating chemical agents is carried out by using an amount of such an agent which is large enough to react with the OH groups present in the alcohol contained in the adduct. Preferably, the treatment is carried out using a slight excess of said agent, which is then removed prior to the reaction of the titanium compound with the thus obtained support.

In the event that the chemical dealcoholation of the $MgCl_2 \cdot pROH$ adduct is carried out by using agents having a reducing activity, for instance an Al-alkyl compound such as Al-triethyl, the thus obtained compound, prior to the reaction with the titanium compound, can be treated with a deactivating agent, for instance $O_2$, in order to deactivate the Al-triethyl possibly present therefore avoiding the reduction of the titanium compound.

The treatment with deactivating agents is avoided when one wishes to at least partially reduce the titanium compound. If, on the other hand, one wishes to reduce the titanium compound to a very great extent, the process for preparing the catalyst component can advantageously comprise the use of reducing agents.

In the reaction step (c), the titanium compound is preferably used in excess with respect to the magnesium compound deriving from step (b). When it is used a titanium compound in which n is 4, the catalyst needs also be treated with a compound having halogenating capability so as to form on the catalyst titanium compounds having at least a Ti-halogen bond. Such compounds are common in the art and represented for example by $SiCl_4$, halogenated hydrocarbons, halogenated aluminum alkyl compounds.

The catalyst component (B) of the invention is selected from Al-alkyl compounds possibly halogenated. In particular, it is selected from Al-trialkyl compounds, for example Al-trimethyl, Al-triethyl, Al-tri-n-butyl, Al-triisobutyl are preferred. The Al/Ti ratio is higher than 1 and is generally comprised between 5 and 800.

The above-mentioned components (A)-(B) can be fed separately into the reactor where, under the polymerization conditions can exploit their activity. It may be advantageous to carry out a pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

The so formed catalyst system can be used directly in the polymerization process of the invention or, alternatively, it can be pre-polymerized beforehand.

As explained, the process of the present invention for the preparation of broad molecular weight polyethylene comprises at least two polymerization stages carried out under different amounts of molecular weight regulator. As mentioned, the process may be carried out either in continuous stirred tank reactor or in liquid full loop reactor. Independently from the process technique, hydrogen is the preferred molecular weight regulator.

When using liquid full loop reactors the hydrocarbon slurry diluent is preferably isobutane, but also other hydrocarbon diluents known in this art, like hexane, heptane or mixtures thereof In this regard, it is preferable that the present process is carried out in accordance with the process of EP 0649860, as described above. Preferably a low concentration of hydrogen is maintained in the first reactor, for instance between 0 and 0.1% by volume, and a high concentration of hydrogen in the second reactor, for instance between 0.5 and 2.4% by volume.

Preferably, the reactor pressure ranges from 30 to 55 bars, more preferably from 40 to 50 bars. The reactor pressure to some extent controls the quantity of slurry that is taken out of the reactor. One embodiment of a double loop reactor process is below summarized. The process is a continuous process. Ethylene is polymerized in isobutane in the presence of a comonomer, for example hexene-1, hydrogen, catalyst, activating agent and anti-fouling agent. The slurry is circulated by a pump in the reactor which essentially consists of vertical jacketed pipe sections connected by trough elbows. The polymerization heat is removed by a water-cooling jacket. The polyethylene is taken out of the reactor with some diluent through settling legs and discontinuous discharge valves. Only a small fraction of the total circulating flow is withdrawn. It is moved to a polymer degassing section in which the solid content is increased.

When using continuous stirred tank reactors, the polymerization process is preferably carried out with the highest hydrogen concentration being set in the first reactor. In the subsequent, further reactors, the hydrogen concentration is preferably gradually reduced, so that the hydrogen concentration used in the third reactor is lower with respect to hydrogen concentration used in the second reactor. The suspension medium is typically a saturated hydrocarbon which is liquid at the polymerization conditions. Preferably, when using three reactors, in the second reactor and in the third reactor a predetermined comonomer concentration is used, preferably increasing from the second reactor to the third reactor. As stated above, in the processes where an ethylene copolymer fraction is prepared, preferably in the second reactor and in the third reactor, ethylene is thus used as monomer and an olefin having from 4 to 8 carbon atoms is preferably used as comonomer.

The molecular mass distribution of the polyethylene molding composition of the present invention can be trimodal. In this way, it is possible to obtain the above-mentioned advantageous combination of properties without excessively complicating the production process by providing three reactors in series and thus advantageously containing the dimensions of the plant. So, in order to prepare a trimodal polyethylene molding composition, the polymerization of ethylene is preferably carried out in a continuous slurry process performed in three reactors connected in series, wherein preferably different reaction conditions are respectively set in the three reactors. Accordingly, in the first reactor, the catalyst components (A) and (B) is preferably fed in together with suspension medium, ethylene and hydrogen. Preferably, no comonomer is introduced in the first reactor. The suspension from the first reactor is then transferred to a second reactor in which ethylene, hydrogen and preferably also a predetermined amount of comonomer, for example 1-butene, are added. The amount of hydrogen fed in the second reactor is preferably reduced compared to the amount of hydrogen fed in the first reactor. The suspension from the second reactor is transferred to the third reactor. In the third reactor, ethylene, hydrogen and, preferably, a predetermined amount comonomer, for example 1-butene, preferably in an amount higher than the amount of comonomer used in the second reactor, are introduced. The amount of hydrogen in the third reactor is reduced compared to the amount of hydrogen in the second reactor. From the polymer suspension leaving the third reactor the suspension medium is separated and the resulting polymer powder is dried and then preferably pelletized.

The polyethylene is obtained by polymerization of the monomers, preferably at temperatures in the range from 70 to 90° C., preferably from 80 to 90° C., at a preferred pressure in the range from 2 to 20 bar, preferably from 2 to 10 bar.

As already mentioned, the catalysts of the present invention is able to combine high activity with the capability of producing a low number of gels in ethylene polymers with broad molecular distribution and good mechanical properties evidenced by the good bubble stability. In particular, the ethylene (co)polymers produced with the process of the invention have a F/P melt index ratio higher than 28 and in particular higher than 30. The versatility of the catalyst allows obtaining these properties both on the CSTR and full loop reactor technique.

Depending on the final molecular weight of the broad molecular weight ethylene (co)polymer can be used for a variety of application like extrusion (film, pipes) or injection-molded to produce injection-molded, preferably rotationally symmetric, finished parts, e.g. closures for blow-molded plastic parts or bottles.

The following examples are given in order to further describe the present invention in a non-limiting manner.

CHARACTERIZATION

The properties are determined according to the following methods:
density: measured at 23° C. in accordance with ISO 1183, in [g/cm$^3$];
The properties are determined according to the following methods:
Porosity and surface area with nitrogen: are determined according to the B.E.T. method (apparatus used SORP-TOMATIC 1900 by Carlo Erba).
Porosity and surface area with mercury:
The measure is carried out using a "Porosimeter 2000 series" by Carlo Erba. The porosity is determined by absorption of mercury under pressure. For this determination use is made of a calibrated dilatometer (diameter 3 mm) CD$_3$ (Carlo Erba) connected to a reservoir of mercury and to a high-vacuum pump (1·10$^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material.

The porosity (cm$^3$/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.
MIF flow index: ASTM-D 1238 condition F
MIP flow Index ASTM-D 1238 condition P
Bulk density: DIN-53194

EXAMPLE 1

Preparation of the solid component (A)

Preparation of the spherical MgCl$_2$-EtOH adduct
A magnesium chloride and alcohol adduct containing about 3 mols of alcohol having spherical form and average size of about 12 μm was prepared following the method described in example 2 of U.S. Pat. No. 4,399,054.

The spherical support, prepared according to the general method underwent a thermal treatment, under N$_2$ stream, over a temperature range of 50-150° C. until spherical particles having a residual ethanol content of about 25% (1.1 mole of ethanol for each MgCl$_2$ mole) were obtained Into a 2 L four-necked round flask, purged with nitrogen, 1 L of TiCl$_4$ was introduced at 0° C. Then, at the same temperature, 70 g of a spherical MgCl$_2$/EtOH adduct containing 25% wt of ethanol and prepared as described above were added under stirring. The temperature was raised to 140° C. in 2 h and maintained for 60 min. Then, the stirring was discontinued, the solid product was allowed to settle and the supernatant liquid was siphoned off The solid residue was then washed once with heptane at 80° C. and five times with hexane at 25° C. and dried under vacuum at 30° C. and analyzed.

The Hg porosity was 0.574 cm$^3$/g, with an average pore radius of 0.1546 μm while the surface area was 65 m$^2$/g.

Polymerization of ethylene
The polymerization of ethylene was carried out in a continuous process in three continuously stirred reactors connected in series. The catalyst prepared as described above, was fed into the first reactor in an amount of 14.3 mmol/h, together with sufficient hexane as suspension medium, triethylaluminum as cocatalyst, ethylene and hydrogen.

The amount of ethylene and the amount of hydrogen were set so that the H$_2$/C$_2$ ratio was 3.78. The polymerization in the first reactor was carried out at a temperature of 84° C. The suspension from the first reactor was then transferred to a second reactor in which the H$_2$/C$_2$ ratio was 0.13 and also 450 g/h of 1-butene added via material dissolved in recirculated suspension medium were introduced. The polymerization in the second reactor was carried out at a temperature of 85° C. The suspension from the second reactor was transferred via a further intermediate H$_2$ depressurization, by means of which in the third reactor the H$_2$/C$_2$ ratio was 0.001. Also in the third reactor an amount of 3700 g/h of 1-butene were introduced into the third reactor. The polymerization in the third reactor was carried out at a temperature of 85° C. The suspension medium was separated from the polymer suspension leaving the third reactor and the remaining polymer powder was dried and pelletized. The polymerization results are reported in table 1

COMPARISON EXAMPLE 1

The polymerization was carried out as described in example 1 with the only difference that the catalyst component (A) was a granular catalyst having a BET surface area of 322 m²/g. The polymerization results are reported in table 1.

EXAMPLE 2

Polymerization in a Double Loop Slurry Process

The catalyst prepared as described in Example 1 was tested in a polymerization plant operating in slurry phase. The process set up consisted of two loop reactors connected in series. Isobutane was used as hydrocarbon diluent for the polymerization, while ethylene, 1-hexene, hydrogen, Aluminum alkyl (triisobutylaluminum) and the above catalyst were continuously introduced into the first loop reactor. In this first stage a copolymer was formed, then the mixture was continuously withdrawn from the first reactor and introduced into the second loop, where also ethylene and hydrogen were fed, and the polymerization was carried out therein in order to form the final desired product. The suspension was continuously withdrawn from the second reactor and subjected to a final reduction in pressure and to steam stripping, so as to evaporate the reactants and the solvent. The composition was recovered in the form of a powder which was subjected to further drying. The specific polymerization conditions are specified in Table 2.

Resin obtained in the present embodiment resulted particularly useful for film applications.

TABLE 1

| EX. | Activity (Kg/g) | Bulk Density Kg/l | MIP | MIF/MIP | Bubble stability | Gel |
|---|---|---|---|---|---|---|
| 1 | 12.5 | 0.37 | 0.31 | 31 | excellent | Low amount. |
| Comp. 1 | 14 | 0.34 | 0.25 | 25 | low | Medium amount |

TABLE 1

| Reactor #1 (note: H2 and C6– to match IV and Eff. Density) | | | | | | |
|---|---|---|---|---|---|---|
| T (° C.) | $C_2^-$ (Kg/h) | Eff. Density (g/cc) | AlR3 (type) | Cat. Mileage (g/g) | PE Int. Viscosity (dL/g) | HMW part (wt %) |
| 75 | 5.0 | 0.938 | Tiba | 10.400 | 5.9 | 52.0 |
| Reactor #2 (note: H2 to match IV) | | | | | | |
| T (° C.) | $C_2^-$ (Kg/h) | $C_6^-$ (g/h) | Eff. Density (g/cc) | Cat. Mileage (g/g) | PE Int. Viscosity (dL/g) | HMW part (wt %) |
| 95 | 5.2 | Absent | 0.9474 | 20.000 | 3.4 | 48.0 |

The invention claimed is:

1. A slurry process for preparing an ethylene polymer comprising:
    a first polymerization stage comprising the step of:
        polymerizing ethylene in the presence of a solid catalyst system and a molecular weight regulator wherein the molecular weight regulator is present in a first molecular weight regulator concentration; and,
    a second polymerization stage comprising the step of:
        polymerizing ethylene in the presence of the solid catalyst system and the molecular weight regulator wherein the molecular weight regulator is present in a second molecular weight regulator concentration,
    wherein the first polymerization stage and the second polymerization stage are carried out
    (a) at a temperature in the range of from 60 to 120° C., and
    (b) the solid catalyst system comprises the product obtained by contacting:
        (A) a solid catalyst component comprising Ti, Mg, halogen, and
        (B) an organoaluminum compound
        wherein the solid catalyst system has:
            (i) a porosity ($P_F$) of at least 0.3 cm³/g; and,
            (ii) a surface area lower than 100 m²/g as determined by BET method, and
    wherein the first molecular weight regulator concentration is different from the second molecular weight regulator concentration, and
    wherein the resulting ethylene polymer has a melt flow ratio F/P, according to ASTM 1238, of higher than 25.

2. The slurry process according to claim 1 wherein the porosity ($P_F$) of catalyst component (A) is higher than 0.4 cm³/g.

3. The slurry process according to claim 2 wherein the porosity ($P_F$) of catalyst component (A) ranges from 0.4 to 1 cm³/g.

4. The slurry process according to claim 1 wherein the surface area determined by BET method, ranges from 30 to 80 m²/g.

5. The slurry process according to claim 1 wherein the average pore radius value of catalyst component (A) for porosity due to pores up to 1 μm, is higher than 0.06 μm.

6. The slurry process according to claim 1 wherein the particles of solid component (A) have substantially spherical morphology and average diameter comprised between 8 to 35 μm.

7. The slurry process according to claim 1 carried out in at least two continuous stirred tank reactors.

8. The slurry process according to claim 1 carried out in two liquid full loop reactors.

9. The slurry process according to claim 7 carried out in three continuous stirred tank reactors connected in series having decreasing concentration of molecular weight regulator.

10. The slurry process according to claim 1 wherein hydrogen is the molecular weight regulator.

* * * * *